(12) United States Patent
Norlander (10) Patent No.: US 7,387,702 B2
(45) Date of Patent: Jun. 17, 2008

(54) PAPER OR PAPERBOARD LAMINATE AND METHOD OF PRODUCING SUCH A LAMINATE

(75) Inventor: Leif Norlander, Falun (SE)

(73) Assignee: Stora Enso Aktiebolag, Falun (SE)

( * ) Notice: Subject to any disclaimer, the term of this patent is extended or adjusted under 35 U.S.C. 154(b) by 372 days.

(21) Appl. No.: 10/258,874

(22) PCT Filed: May 10, 2001

(86) PCT No.: PCT/SE01/01019

§ 371 (c)(1),
(2), (4) Date: Oct. 30, 2002

(87) PCT Pub. No.: WO01/88269

PCT Pub. Date: Nov. 22, 2001

(65) Prior Publication Data

US 2003/0155088 A1 Aug. 21, 2003

(30) Foreign Application Priority Data

May 15, 2000 (SE) .................................... 0001786

(51) Int. Cl.
*D21F 11/00* (2006.01)
(52) U.S. Cl. .............. 162/125; 162/123; 162/129; 162/132; 162/135; 428/532; 428/533; 428/536
(58) Field of Classification Search ............... 162/125, 162/123, 129, 132, 135; 428/532, 533, 534, 428/535, 536, 537.5
See application file for complete search history.

(56) References Cited

U.S. PATENT DOCUMENTS 6,537,680 B1 * 3/2003 Norlander et al. .......... 428/532

FOREIGN PATENT DOCUMENTS

| DE | 3427 196 | 7/1985 |
|---|---|---|
| SE | 445 937 | 7/1986 |
| WO | WO 95/26441 | 10/1995 |
| WO | WO 99/02777 | 1/1999 |
| WO | WO 00/14333 | 3/2000 |

* cited by examiner

*Primary Examiner*—Mark Halpern
(74) *Attorney, Agent, or Firm*—Nixon & Vanderhye (57) ABSTRACT

Paper or paperboard laminate composed of at least one bulk-promoting layer, here termed bulk layer (1), 40-98% of which is composed of cellulose fibers with a freeness value of 550-950 ml CSF, and on at least one side of the bulk layer at least one secondary layer (3a, 3b'), which has a greater density than the bulk layer, the secondary layer and bulk layer being joined indirectly to one another over basically the whole of their opposing surfaces and the laminate having a bending stiffness index greater than 2.5 $Nm^7/kg^3$, but less than 14 $Nm^7/kg^3$, calculated as a geometric mean value for machine direction and cross direction. According to the invention a thin intermediate layer (2a), which has a higher drainage resistance than the bulk layer and has been formed together with the bulk layer, is arranged between the said bulk layer (1) and secondary layer (3a, 3b').

37 Claims, 9 Drawing Sheets

PAPER OR PAPERBOARD LAMINATE AND METHOD OF PRODUCING SUCH A LAMINATE

This application is a 371 of PCT/SE01/01019 filed on 10 May 2001.

1. Technical Field

The invention relates to a paper or paperboard laminate composed of at least one bulk-promoting layer, here termed bulk layer, 40-98% of which is composed of cellulose fibres with a freeness value of 550-950 ml CSF, and on at least one side of the bulk layer at least one secondary layer, which has a greater density than the bulk layer, the secondary layer and bulk layer being joined indirectly to one another over basically the whole of their opposing surfaces and the laminate having an bending stiffness index greater than 2.5 $Nm^7/kg^3$, but less than 14 $Nm^7/kg^3$, calculated as a geometric mean value for machine direction and cross direction The invention also relates to a method for producing such a laminate.

2. Prior Art

WO 00/14333 describes a paper or paperboard laminate, which has a great stiffness. This is achieved by using fibres in the laminate with a freeness value of 550-950 ml CSF in a bulk-promoting layer in the laminate, termed bulk layer, in combination with a secondary layer on one or both sides of the bulk layer. This also affords the advantage that the laminate has a lower density and therefore uses less material than previously known paperboard laminate intended for the same type of application as the laminate according to the invention, such as material for the packaging of liquid and solid foodstuff and also for the packing and packaging of industrial and other goods, or as an intermediate product for the production of such material or other finished products. The invention according to WO 00/14333 discloses a paper or paperboard laminate with a bending stiffness index greater than 2.5 and less than 14 $Nm^7/kg^3$, which represents a bending stiffness index more than 2 to 7 times greater than multilayer paperboard currently produced by conventional means. At the same time the laminate possesses sufficient strength in the bulk layer, which normally constitutes the middle layer in the laminate, to permit scoring and subsequent folding of the material. A particular advantage, moreover, is that after scoring the laminate can be readily folded both towards and away from the scored impression.

In the production of the laminate according to WO 00/14333 the secondary layer/layers is/are laminated to the bulk layer by means of a binder, usually a latex binder. In this the most preferred binder content is specified as 10 to 20% of the weight of the laminate. This binder is the single most expensive raw material used in the production of the laminate. According to one aspect of WO 00/14333, attempts have therefore been made to reduce the quantity of binder required, whilst retaining the high bending stiffness and good strength in the thickness direction of the laminate. It is specified in this context that a binder content of 1-5%, preferably 2-5% may be sufficient According to WO 00/14333, however, this applies only to laminates in which the bulk layer has a basis weight not exceeding 100 $g/m^2$, preferably not exceeding 80 $g/m^2$.

It has subsequently proved difficult to achieve sufficient strength in the thickness direction (z-strength), for example greater than 200 kPa, with binder quantities of less than approximately 10 to 12%. Being able to achieve a high z-strength with low binder contents has therefore proved to be a problem, especially where the bulk layer has high basis weights. It has furthermore proved difficult, with high basis weights in the laminate in excess of approximately 200 $g/m^2$, for example, to prevent cockling caused by shrinkage across the web during drying.

Other patent applications that may be regarded as pertaining to the same technical field but which are not particularly relevant in relation to the present invention include WO 99/02777, WO 95/26441, U.S. Pat. Nos. 5,080,758 and 4,913,773, for example.

DESCRIPTION OF THE INVENTION

The object of the invention is to reduce the abovementioned problem, a paper or paperboard laminate being disclosed which constitutes a development of the laminate according to WO 00/14333. In the laminate according to the invention the requisite z-strength is achieved with relatively low contents of binder, especially latex binder, even when using bulk layers with relatively high basis weights. The problem of cockling in the case of high total basis weights in the laminate is also reduced. The laminate according to the invention furthermore has the same advantages as the laminate according to WO 00/14333 when scoring the laminate.

These and other advantages are achieved by means of the laminate according to the invention, as specified in claim 1.

According to the invention an additional layer is used in the laminate compared to that disclosed in WO 00/14333. The said additional layer comprises a thin intermediate layer, which is arranged between the secondary layer and the bulk layer and which has a higher drainage resistance than the bulk layer. The intermediate layer has furthermore been formed together with the bulk layer, which means that the intermediate layer and the bulk layer are joined directly to one another over basically the whole of their opposing surfaces. The intermediate layer, on its side remote from the bulk layer, is preferably joined directly to the secondary layer over basically the whole of their opposing surfaces.

According to one aspect of the invention the said intermediate layer is composed for the most part of fibres of lightly beaten bleached or unbleached pulp or CTMP, preferably of bleached or unbleached chemical cellulose pulp produced from a cellulose raw material composed for the most part of softwood and/or hardwood. The intermediate layer furthermore has a basis weight of at least 2 $g/m^2$, preferably at least 3 $g/m^2$ but less than 20 $g/m^2$, preferably less than 15 $g/m^2$ and even more preferably less than 10 $g/m^2$ and a drainage resistance of less than 35° SR, preferably less than 30° SR and even more preferably less than 20° SR.

According to one embodiment of the invention the intermediate layer according to the invention is arranged only on one side of the bulk layer, by forming it on wire together with the bulk layer. The secondary layer can be arranged directly against the other side of the bulk layer, this secondary layer also preferably being formed together with the bulk layer and the intermediate layer, suitably by means of a three-layer head box. According to an alternative embodiment intermediate layers according to the invention are arranged on both sides of the bulk layer by forming these on wire together with the bulk layer, preferably by means of a three-layer head box.

The fundamental reasons why the quantity of binder can be reduced have not been clearly determined, but one theory, without limiting the scope of the invention, is that the thin intermediate layer provides an increased contact surface with the secondary layer compared to the coarser fibre that makes up the bulk layer. The thin intermediate layer, which is formed together with/in the bulk layer, has fibres that are partially oriented in the z-direction of the sheet (mixed with the surface of fibres in the bulk layer) and are therefore, together with binder, anchored in the bulk layer. This increased contact surface between the bulk layer, including the intermediate layer, and the secondary layer means that the binder acts on a larger surface so that greater z-strength is also obtained.

Other aspects of the invention with regard to the nature of the layers, any additional layer and production of the laminate, including any additives, etc., correspond to the disclosure in WO 00/14333, the specification of which is hereby incorporated through reference.

This therefore means, for example, that the bulk layer has a very low density of 50-300 kg/m$^3$, preferably 70-200 kg/m$^3$, suitably 100-180 kg/m$^3$ and a basis weight of 30-300 g/m$^2$. According to once conceivable embodiment it has a basis weight of 40-80 g/m$^2$, according to another embodiment a basis weight of 70-120 g/m$^2$. According to another aspect of the invention the bulk layer has a thickness of 0.1-6 mm, preferably 0.2-1.0 mm, suitably 0.3-0.7 mm.

The low-density bulk layer may advantageously be produced by dry forming or by wet forming of chemi-thermo-mechanical pulp (CTNP) or other "mechanical" pulp based on softwood fibres, such as TMP, with a high freeness value. Dry forming is preferable from one point of view, it being possible to use any known technique for this, but regardless of the forming technique the freeness of the pulp should be higher than 550 CSF, preferably higher than 600 CSF and even more preferably higher than 650 CSF, the optimum being higher than 700 CSF. A high freeness value of the fibre material for the said first layer ensures that the sheet can be pressed when draining and consolidating the sheet without the density increasing to an undesired extent Other raw fibres with high wet resilience can also be included to a certain extent in the bulk layer, such as chemically cross-linked fibres, which often have a small drainage resistance and high resilience after wet pressing, but are not to be preferred at least for cost reasons.

The secondary layer furthermore has a considerably greater density and tensile strength than the bulk layer, e.g. a density which is at least twice and preferably at least three times the density of the bulk layer, the optimum being at least four times greater. Thus the secondary layer may have a density of 300-1500 kg/m$^3$, preferably 400-850 kg/m$^3$. The average thickness of the secondary layer/the individual secondary layers is typically only 3-20%, preferably no more than 15% and suitably no more than 10% of the thickness of the bulk layer.

A laminate according to the invention consisting of one bulk layer, one intermediate layer and one secondary layer on at least one side of the bulk layer, preferably on both sides thereof has a basis weight of between 50 and 500 g/m$^2$. Within the said interval a laminate composed according to the invention may have a basis weight which depends on the reciprocal relationships between the thicknesses and densities of the bulk layer, the intermediate layers and the secondary layers. Thus when the bulk layer is relatively thick, the laminate can have a basis weight of 75-400 g/m$^2$, preferably 100-350 g/m$^2$, suitably 100-250 g/m$^2$ or 90-200 g/m$^2$. If on the other hand the bulk layer is relatively thin, the laminate can have a basis weight of 300-500 g/m$^2$, preferably 350-450 g/m$^2$. In other words, in this case the secondary layer/secondary layers predominate in terms of weight. An intermediate case is also conceivable where the laminate consisting of the said layers has a basis weight of 200-400 g/m$^2$, preferably 250-350 g/m$^2$. The tensile index of the laminate according to the invention may amount to 25-150 Nm/g, preferably 50-100 Nm/g.

During manufacture the bulk layer including the intermediate layer or layers is laminated using binders and with controllable pressure and time to the said secondary layer of high tensile strength to form a laminate according to the invention. Lamination may be advantageously carried out at the same time as the bulk layer is consolidated. However, this is not a prerequisite, it being equally possible to first form and consolidate the bulk layer, including the intermediate layer or layers, by drying, the bulk layer then being laminated to the desired secondary layer. The binder, especially latex binder, content used is 1-20%, suitably 1-10%, preferably 1-7% and even more preferably 1-5% of the weight of the laminate, calculated on dry weights. A z-strength of at least 100 kPa, preferably at least 150 kPa and even more preferably 200 kPa can thereby be achieved according to the invention.

In addition to latex binder, suitable binders for impregnation of the bulk layer are other water-soluble polymers, or aqueous dispersions of polymers selected from the group comprising polyvinyl acetate, polyvinyl alcohol, polyacrylates, polyacrylic acid, polyethylene, acrylamide, polystyrene and maleic acid derivative in the form of homo- and copolymers of the said polymers. Together with the binder or binders wetting agents may also be applied, such as sodium dodecylsulphate, hydrofobing agents and any other desired ingredients. It is deemed suitable to use latex binder for the impregnation of the bulk layer and other binder, such as starch, carboxymethyl cellulose and gums in order to produce bonding between various fibre-based layers, including bonding between the bulk layer and the secondary layer/layers.

The laminate according to the invention is preferably used for food packaging or packaging for various types of consumer products etc. Furthermore laminate of the said type may well serve as protection for the storage and transport of goods for industrial use.

BRIEF DESCRIPTION OF DRAWINGS

The invention will be further described below with reference to the drawings, of which.

DESCRIPTION OF METHOD AND ARRANGEMENTS FOR MANUFACTURING THE LAMINATE

Figure 1:
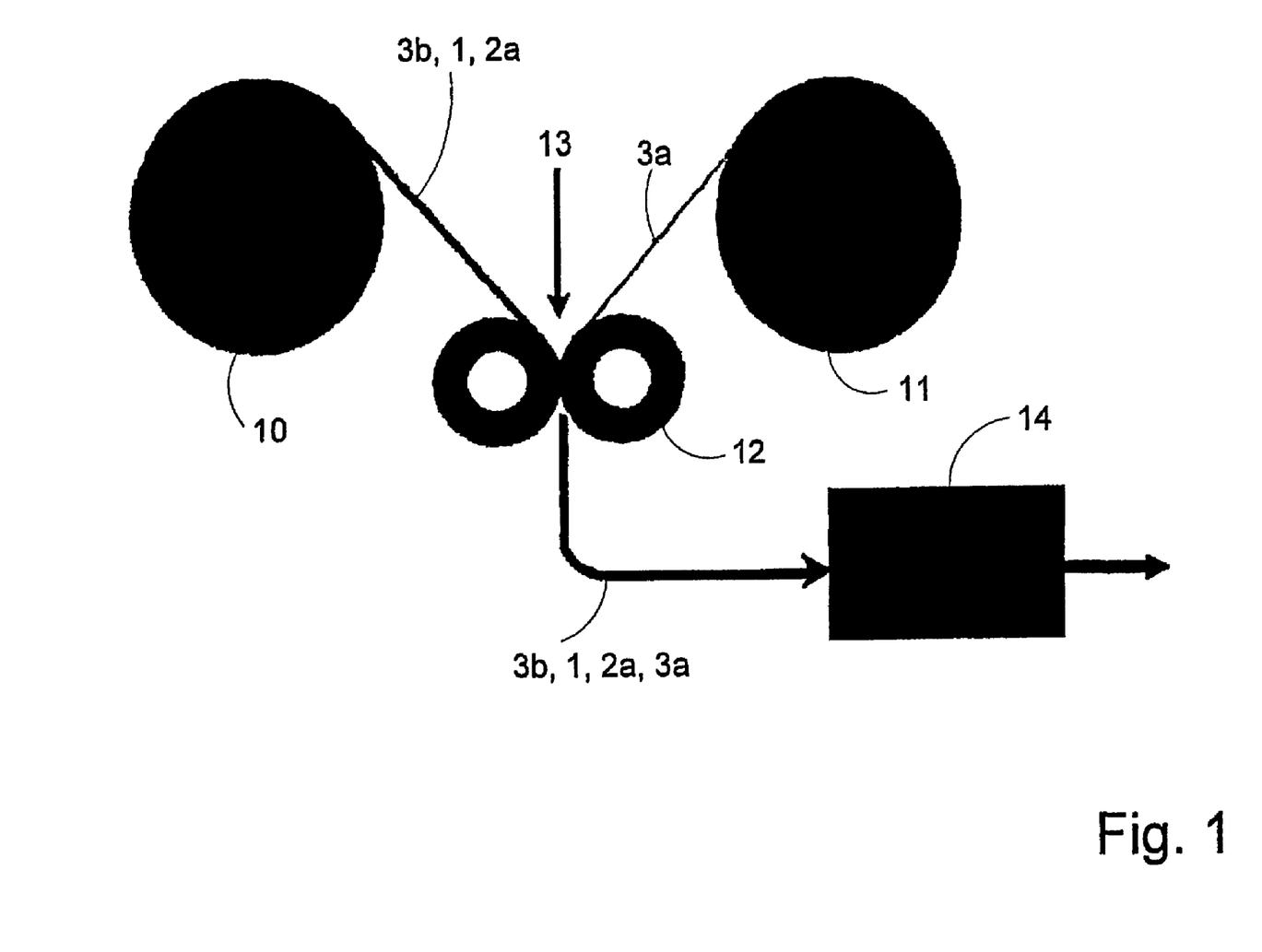
FIG. 1 shows in diagrammatic form a pilot plant according to a first conceivable embodiment for the manufacture of a paperboard laminate according to the invention.
Figure 3:
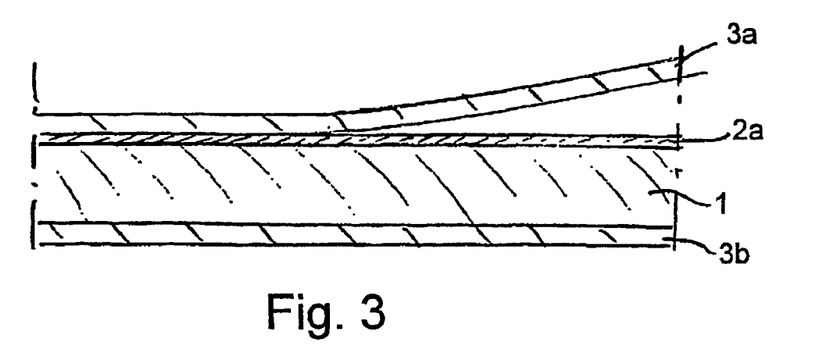
FIG. 3 shows in diagrammatic form a laminate in cross-section according to a first conceivable embodiment according to the invention.

FIG. 1 shows a pilot plant, which was used for the lamination (stage 4) in the series of experiments 1 and 2 described further below. Material in web form 3b, 1, 2a from the storage reel 10 was laminated to material in web form 3a from a separate storage reel 11. The material in web form 3b, 1, 2a on the storage reel 10 had in an earlier stage been formed by means of a three-layer head box (see description of experiment stage 3) and was made up as shown in FIG. 3, with secondary layer 3b, bulk layer 1 and the intermediate layer 2a according to the invention. The material in web form 3a on the storage reel 11 had been manufactured in a separate earlier stage (see description of experiment stage 2). In the lamination, the exposed surface of the intermediate layer 2a is turned towards the secondary layer 3a and the two materials in web form are brought together in a size press 12. Using suitable equipment, latex binder, indicated by 13, is fed in the desired concentration into the opening between the materials in web form that were fed from the reels 10 and 11 and into the size press 12. After the size press 12, the joined and moist web 3b, 1, 2a, 3a was fed to a dryer 4 and subsequently reeled up or cut into sheets (not shown).

The apparatus set-up according to FIG. 1 can also be used for manufacturing the laminate according to FIG. 5, the composition of which is described in greater detail below. In this case both the reels 10 and 11 have a material in web form made up of secondary layer 3b, bulk layer 1 and intermediate layer 2a, the two respective intermediate layers 2a being turned towards one another.

Figure 2:
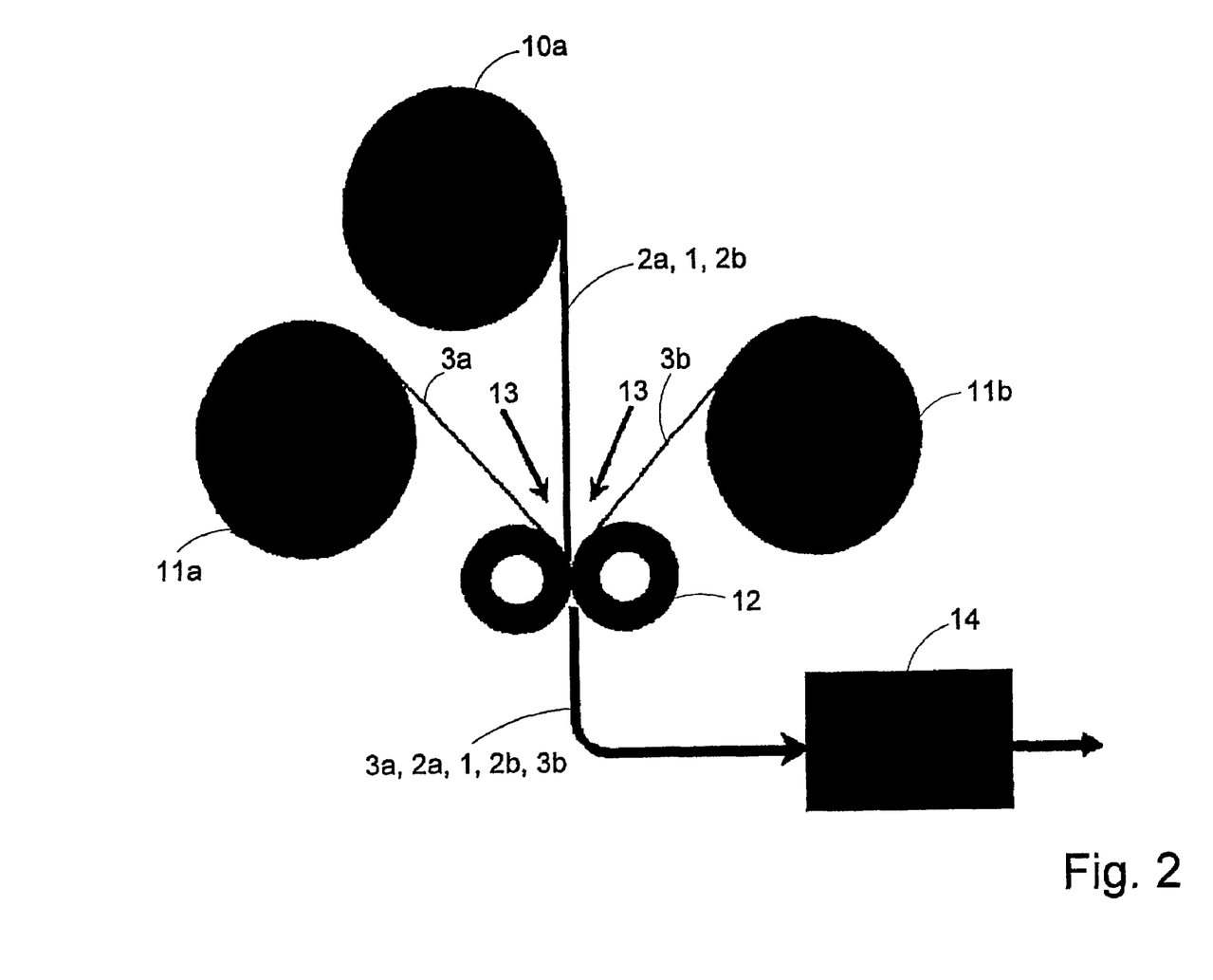
FIG. 2 shows in diagrammatic form a pilot plant according to another conceivable embodiment for the manufacture of the laminate according to the invention.
Figure 4:
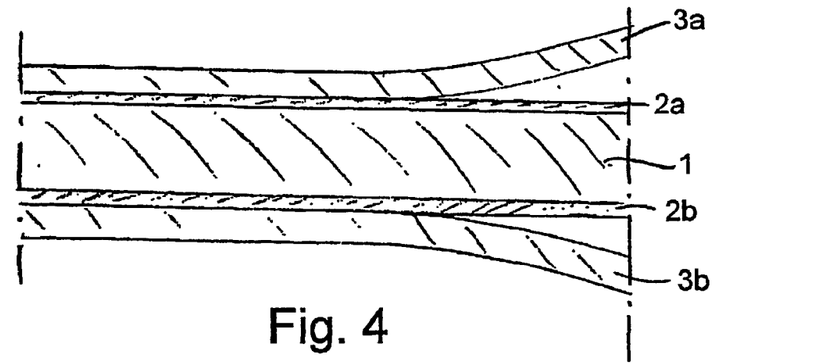
FIG. 4 shows in diagrammatic form a laminate in cross-section according to a second conceivable embodiment according to the invention.

FIG. 2 shows a further possible embodiment for the lamination of a laminate according to FIG. 4. Here the material in web form on the reel 10a comprises a bulk layer 1, which was formed in an earlier stage together with a thin intermediate layer 2a and 2b on either side of the bulk layer 1. The secondary layers 3a and 3b are fed from the reels 11a and 11b respectively to either side of the material from the reel 10a, and into the size press 12. In the size press 12 latex binder 14 can be applied to both sides of the bulk layer 1 by way of intermediate layers 2a and 2b respectively. This affords the advantage that the absorption of binder takes place more rapidly since the conveying distance for the binder is halved.

Alternative methods for the application of binder are through the use of sprays, blade or roll coater prior to pressing and bringing the various layers together as described in WO 00/14333.

It will also be appreciated that the storage reels 10, 11 or alternatively 10a, 11a, 11b can be replaced in an industrial plant by equipment for the manufacture of corresponding material, that is to say forming equipment and where relevant also by drainage and drying equipment. The object of this is to provide a continuous process from raw material to finished laminate.

EMBODIMENTS OF THE LAMINATE ACCORDING TO THE INVENTION

Figure 5:
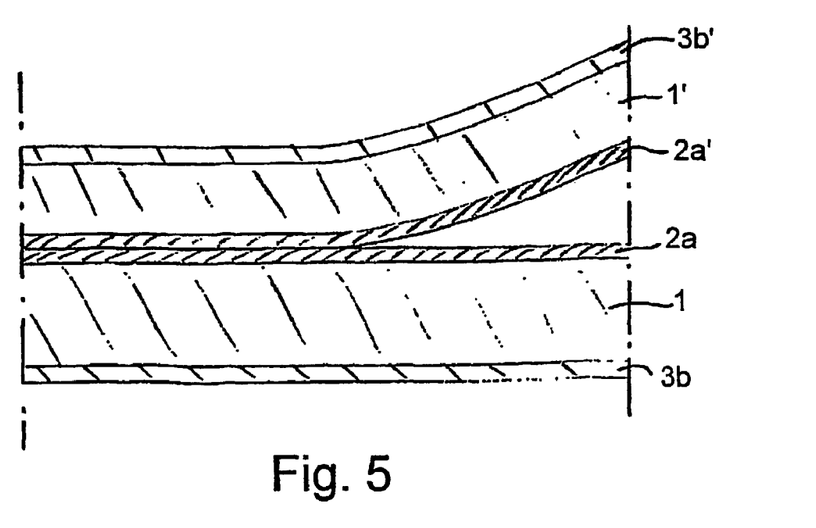
FIG. 5 shows in diagrammatic form a laminate in cross-section according to a third conceivable embodiment according to the invention.
Figure 6:
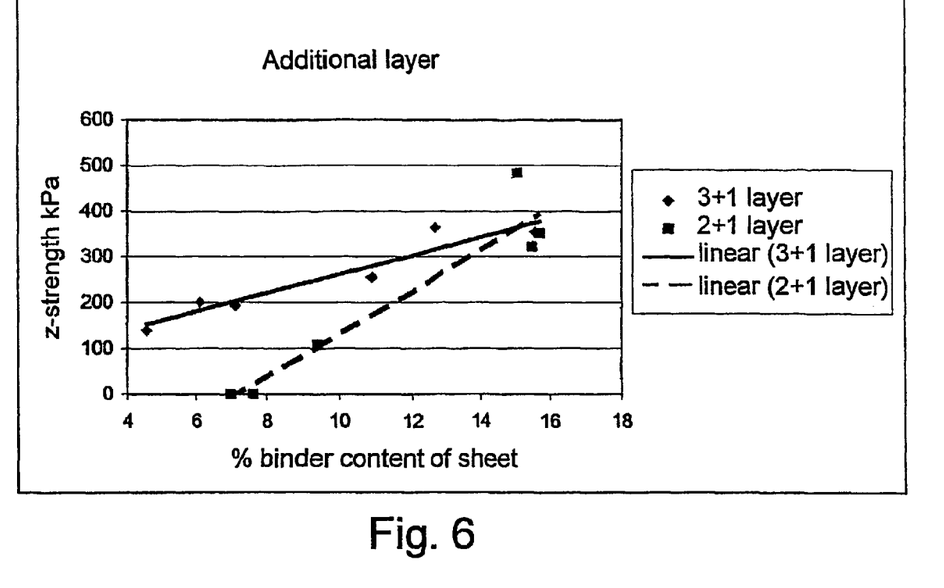
FIGS. 6-17 show result diagrams for experiments performed.
Figure 7:
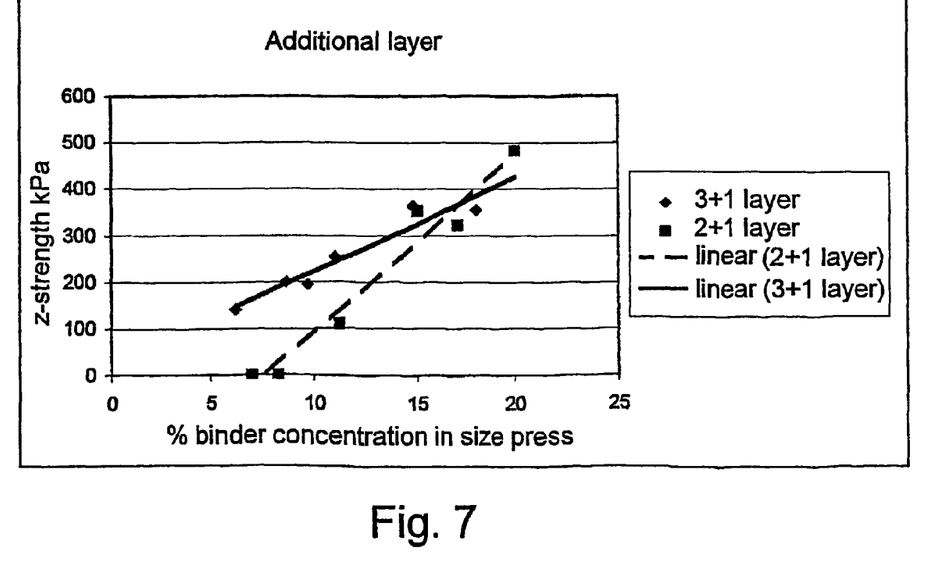
Figure 8:
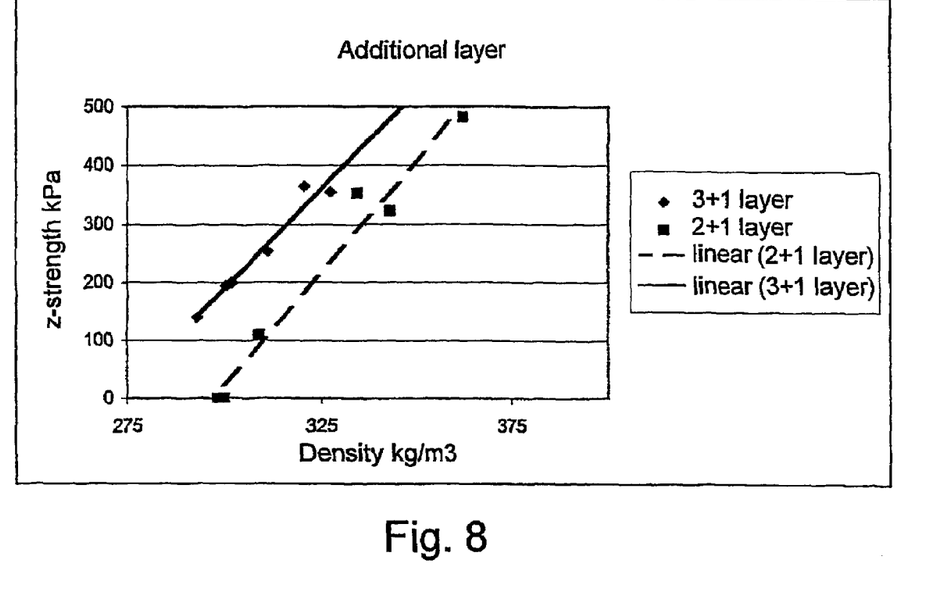
Figure 9:
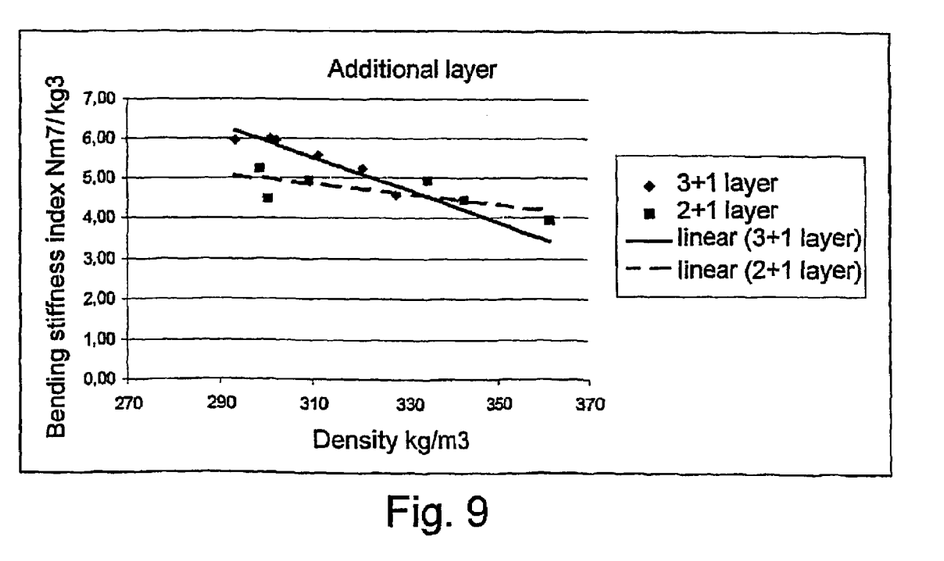
Figure 10:
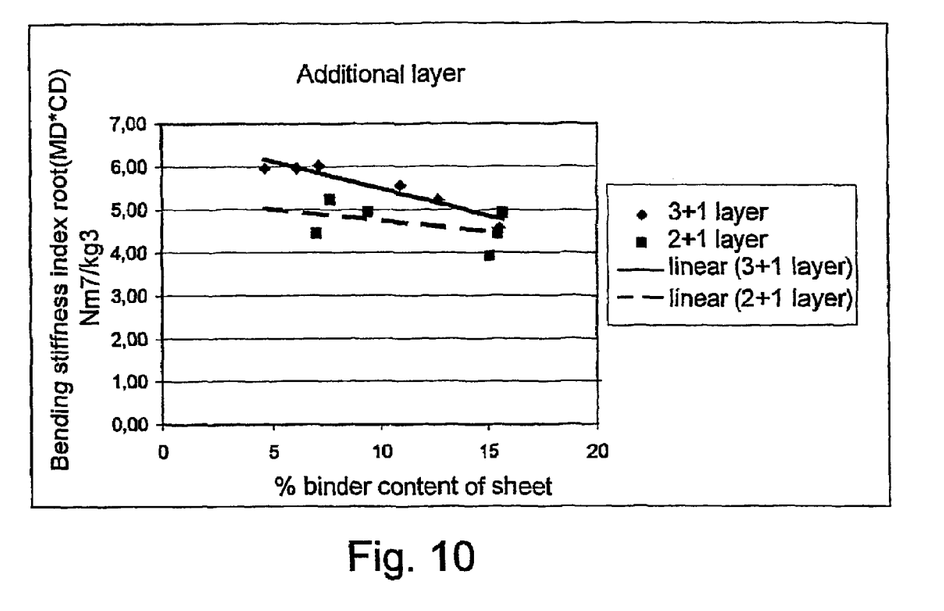
Figure 11:
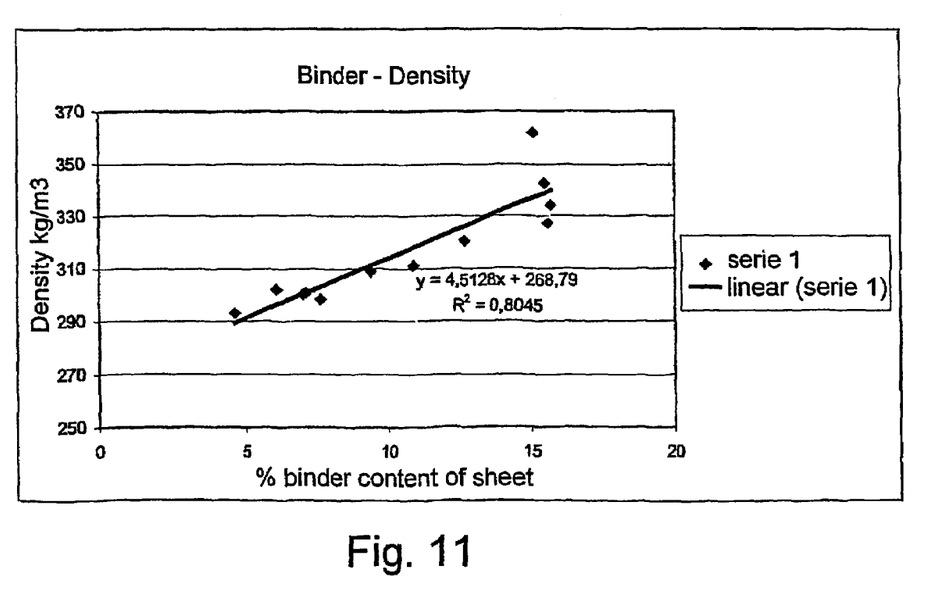
Figure 12:
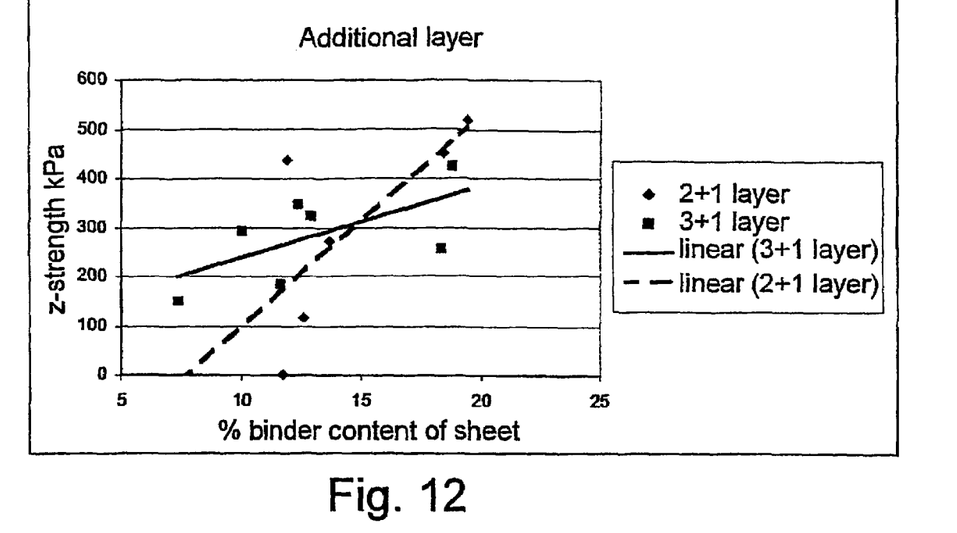
Figure 13:
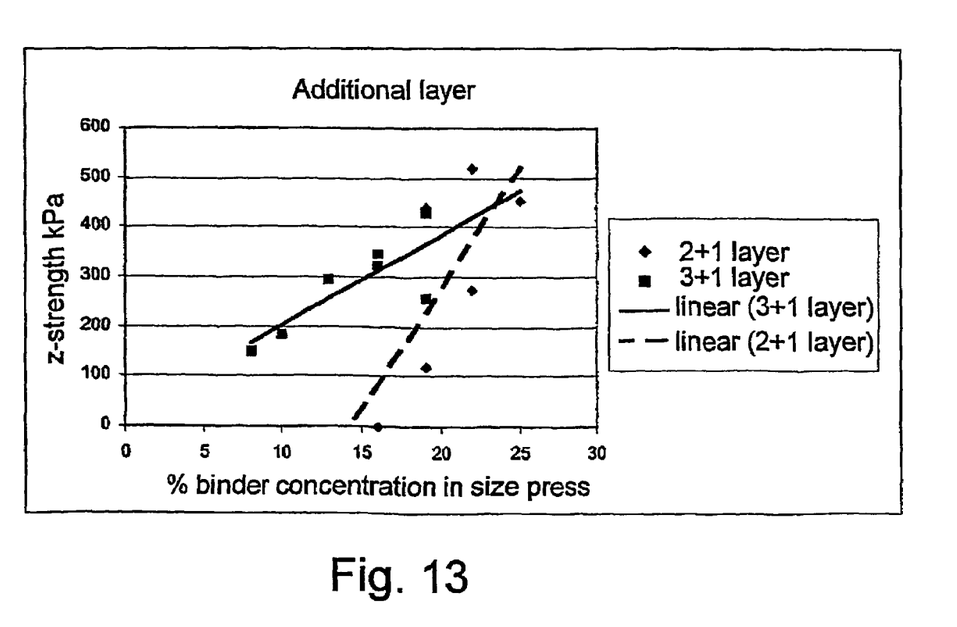
Figure 14:
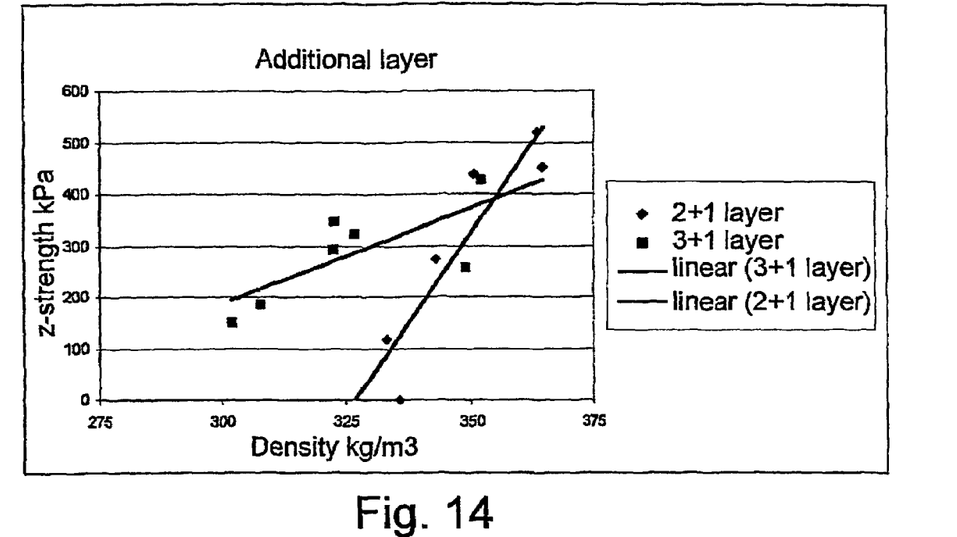
Figure 15:
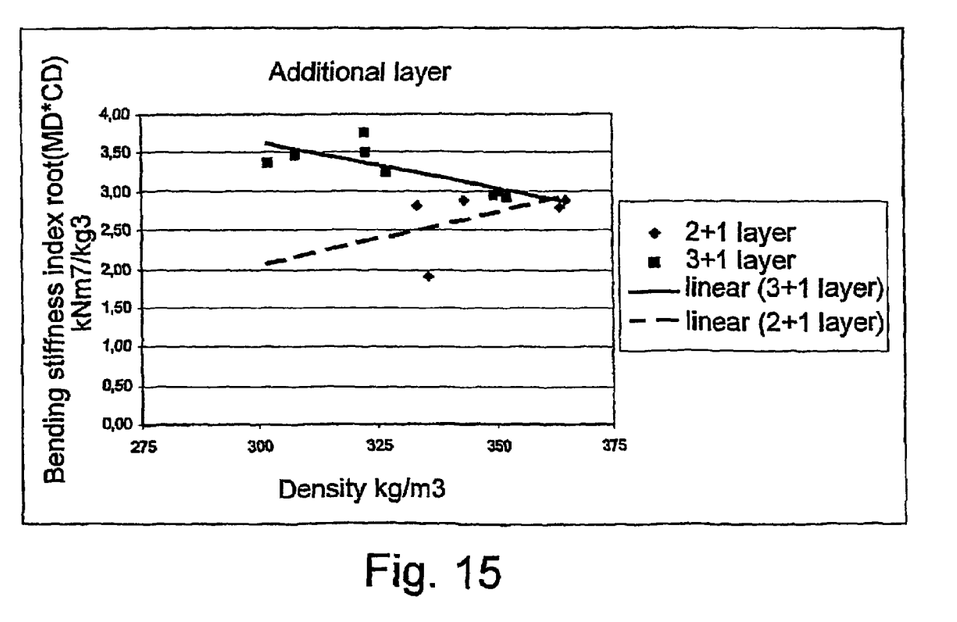
Figure 16:
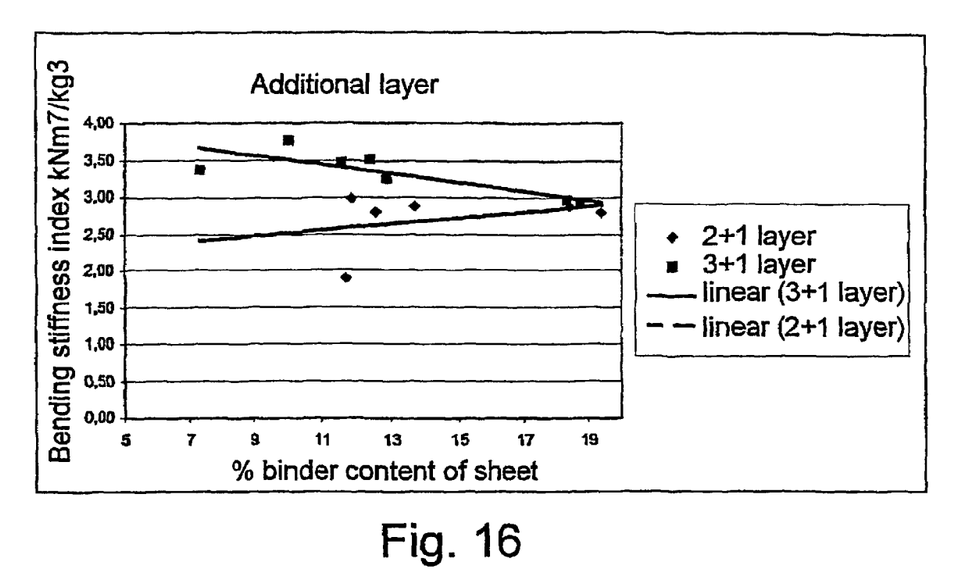
Figure 17:
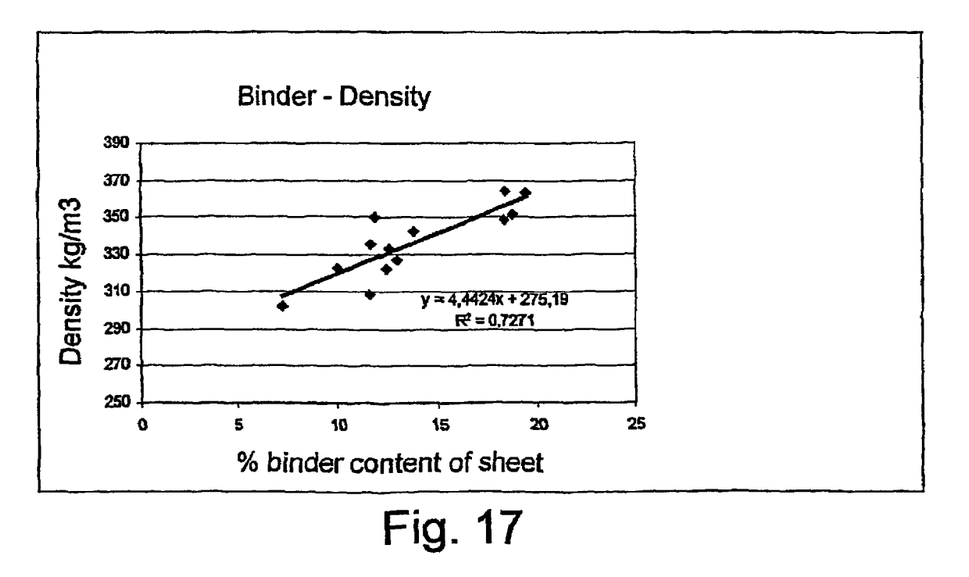

FIGS. 3 to 5 show three conceivable embodiments of the laminate according to the invention, which were manufactured according to the description of FIG. 1 or FIG. 2. It will be appreciated that the embodiments shown merely constitute a number of illustrative examples and that a number of other embodiments are conceivable within the scope of the invention. Thus, for example, the number, nature and positioning of the different layers can be varied and supplemented without departing from the fundamental principles of the invention, as expressed in the following patent claims.

EXAMPLE 1

FIG. 3

The laminate L1 according to the embodiment consists of four layers. A thin intermediate layer 2a of paper with a relatively open structure and a secondary layer 3b have been formed together with a bulk layer 1 having the low density and high freeness value typical of the invention. The secondary layer 3b typically comprises a paper layer having a substantially higher density than the bulk layer 1 and also rolled and joined to the bulk layer 1 so that the consolidated laminate acquires the characteristic attributes of the laminate according to the invention. On the same side as the intermediate layer 2a, the laminate in a later stage has had a secondary layer 3a added, which typically comprises a paper layer but can in principle also be composed of a non-fibrous layer, such as a barrier layer, for example a plastic film, metallised plastic film or an aluminium foil of considerably greater density than the bulk layer 1.

EXAMPLE 2

FIG. 4

In addition to the layers shown in the laminate L1, FIG. 3, the laminate L2, FIG. 4, comprises a second thin intermediate layer 2b, which adjoins the bulk layer 1 on the opposite side to the intermediate layer 2a, inside the secondary layer 3b. In this case the bulk layer 1 and the two intermediate layers 2a and 2b have been formed together, following which the secondary layers 3a and 3b have been added to the laminate in a later stage. Each secondary layer 3a and 3b typically comprises a paper layer but one of them can in principle also be composed of a non-fibrous layer, such as a barrier layer, for example a plastic film, metallised plastic film or an aluminium foil of considerably greater density than the bulk layer 1.

EXAMPLE 3

FIG. 5

The laminate L3, FIG. 5, comprises a composite made up of double the laminate L1 according to FIG. 3, that is to say twice a laminate made up of secondary layers 3b, 3b', bulk layers 1, 1' and intermediate layers 2a, 2a' but without secondary layer 3a. In the construction the two intermediate layers 2a, 2a' have been turned towards one another and joined together, for example in a size press in the same way as shown in FIG. 1. This produces a laminate with double bulk layer, which therefore has a higher basis weight and very good bending stiffness index.

ACCOUNT OF EXPERIMENTS CARRRIED OUT

Equipment

The experiments were carried out on an experimental paper machine (XPM) with a width of approximately 450 mm.

The equipment used was as follows:

Conical refiner, type JC 00 (Jylhävaara) for beating of the stock at 4% pulp consistency.

Fourdrinier wire equipped with three-layer head box. This gives the facility for forming three layers with different fibre composition one on top of another. The fibre concentrations in the head box were between 0.2 and 1% and dependent on the speed and the basis weight of the various layers formed.

Single-felt press with Teflon-coated roll. The usual linear load in the press was approximately 12 kN/m, which resulted in a dry solids content of 35 to 40% after the press.

Size press with continuously adjustable linear load.

Drying section consisting of eleven electrical (IR) heated cylinders with a diameter of 750 mm. The cylinders have Teflon-coated surfaces. All cylinders, except for No. 2 and No. 11, were provided with drying wires.

The binder used in all experiments was Appretan 540 S from Clariant Perstorp.

Testing and Analysis

In manufacturing multilayer material the basis weight of the various layers was determined by determining the area of the sample and weighing the material after formation of a single layer and for the subsequent layers by calculating the difference in basis weight when these are formed together with the first-mentioned layer.

The quantity of binder was determined by the following method. The basis weight of the sample minus the total basis weight for the constituent material in web form divided by the total basis weight of the sample. The binder concentration in the size press is determined by weighing in a test quantity of binder followed by drying to a constant weight at 105° C.

Testing of all paper characteristics was carried out using standard methods in a controlled climate, 23° C., 50% RH See WO 00/14333 for further information.

1$^{st}$ Series of Experiments

The experiments were organised in four stages:
1. In stage 1 the fibre raw material was pulped in water and where applicable beaten to the requisite beating degree. HT-CTMP for the bulk layer was pulped in water and pumped without beating to storage or machine vats.
2. In stage 2 the surface layer 3a (see FIG. 3) was made with the following composition; 30 g/m² 50/50% St32/St61 beating degree 34° SR. Machine speed approx 18 m/min. The final dry solids content of the material was approx. 85%.
3. In stage 3 material was made with two layers (reference) and three layers (according to FIG. 3). See Table 1, in which the order from left to right shows the order calculated from the wet wire and upwards. The dry solids content of the material after drying was approx. 85%. The machine speed was approx. 10 m/min.
4. In stage 4 the layer 3a was laminated with the multilayer material in web form (two or three layers). In the size press binder was added in varying concentrations between the two webs. The depth of the pool in the size press was between 10 and 20 mm. The linear load in the size press was kept constant at approx. 26 kN/m. The material was finally dried in the cylinder drying machine to a final dry solids content of 90-95%. The machine speed was kept constant at approx. 5 m/min.

TABLE 1

| Final product designation | Layer 2a | Layer 1 | Layer 3b |
|---|---|---|---|
| 3 + 1 layer (Acc. to FIG. 3) | 3-5 g/m² St32 20° SR | 70 g/m² HT-CTMP 750 CSF | 30 g/m² 50/50% St32/St61 32° SR |

TABLE 1-continued

| Final product designation | Layer 2a | Layer 1 | Layer 3b |
|---|---|---|---|
| 2 + 1 layer (reference) | omitted | 80 g/m² HT-CTMP 750 CSF | 30 g/m² 50/50% St32/St61 32° SR |

St32 = Stora32, bleached softwood sulphate pulp
St61 = Stora61, bleached birchwood sulphate pulp
HT-CTMP from SCA Östrand, PC Fluff CTMP Results of 1st Series of Experiments It can be seen from Table 1a-b and diagrams in FIGS. 6-11 that owing to the insertion of the thin intermediate layer 2a (sample designation 3+1 layer), a higher z-strength is obtained for the same binder content compared to material manufactured without the said intermediate layer 2a (sample designation 2+1 layer). It is furthermore apparent that the z-strength and the bending stiffness index are higher for laminate manufactured with the intermediate layer 2a compared to material without the layer 2a for density lower than approx. 320 kg/m³. According to diagram 1 the intermediate layer 2a gives a saving in respect of binder from 11 to 7% units in order to achieve a z-strength of 200 kPa, that is to say approx. 35% lower binder consumption. It must be emphasised here that the 200 kPa limit must not be regarded as an absolute limit for a functioning packaging material, but should instead be taken as a guide.

2nd Series of Experiments

The experiments were organised in four stages:
1. In stage 1 the fibre raw material was pulped in water and where applicable beaten to the requisite beating degree. HT-CTMP for the bulk layer was pulped in water and pumped without beating to storage or machine vats.
2. In stage 2 the surface layer 3a was made with the following composition; 30 g/m² 50/50% St32/St61 beating degree 34° SR Machine speed approx. 18 m/min. The final dry solids content of the material was approx. 85%.
3. In stage 3 material was made with two layers or three layers. See Table below, in which the order from left to right shows the order calculated from the wet wire and upwards. The dry solids content of the material after drying was approx. 85%. The machine speed was approx. 10 m/min.
4. In stage 4 the layer 3a was laminated with the multilayer material in web form (two or three layers). In the size press binder was added in varying concentrations between the two webs. The depth of the pool in the size press was between 10 and 20 mm for the reference material without the layer 2a. The binder absorption through the sheet was slower with the layer 2a. This was counteracted by increasing the retention period of the sheet in the binder by increasing the depth of the pool to 30-50 mm. The linear load in the size press was kept constant at approx 26 kN/m. The material was finally dried in the cylinder drying machine to a final dry solids content of 90-95%. The machine speed was kept constant at approx. 3 m/min.

TABLE 2

| Final product designation | Layer 2a | Layer 1 | Layer 3b |
|---|---|---|---|
| 3 + 1 layer (Acc. to FIG. 3) | 5-9 g/m² St32 20° SR | 150 g/m² HT-CTMP 750 CSF | 40 g/m² 50/50% St32/St61 32° SR |

TABLE 2-continued

| Final product designation | Layer 2a | Layer 1 | Layer 3b |
|---|---|---|---|
| 2 + 1 layer (reference) | omitted | 150 g/m² HT-CTMP 750 CSF | 40 g/m² 50/50% St32/St61 32° SR |

St32 = Stora32, bleached softwood sulphate pulp
St61 = Stora61, bleached birchwood sulphate pulp
HT-CTMP from SCA Östrand, PC Fluff CTMP Result of 2$^{nd}$ Series of Experiments The results are shown in Table 2a-b and diagrams in FIGS. 12-17. The results here too show that the quantity of binder that was required in order to achieve a z-strength of between 100 and 400 kPa is substantially lower when a very thin intermediate layer (2a) of fibre material, which gives a higher density in forming, is formed together with the coarser fibres of the bulk layer (1). At 200 kPa approx. 7,5% of binder is required compared to approx. 12-13%, that is to say that, here too, there is a potential saving of approx 35%.

The invention is not confined to the embodiments described above, but may be varied within the scope of the claims below. In particular, it will be appreciated that laminate variants other than those described here, which correspond to the laminate described in WO 00/14333, but with one or two additional intermediate layers according to the invention, can be produced according to the present invention, with a reduced binder requirement.

TABLE 1a

1$^{st}$ Series of experiments

| | | | Nominal basis weights | | | | | | | | | |
|---|---|---|---|---|---|---|---|---|---|---|---|---|
| Sample | BW 1 g/m2 | BW 2 g/m2 | BW 2b g/m2 | BW 3 g/m2 | Binder conc. % | Binder in sheet % | BW g/m2 | Thickness um | Density kg/m3 | z-strength kPa | Bending stiffness(MD* CD)Nm7/kg3 | Sample designation |
| 120 | 30 | 70 | 3.5 | 30 | 11 | 10.9 | 153.8 | 494 | 311 | 254 | 5.57 | 3 + 1 layer |
| 121 | 30 | 70 | 3.5 | 30 | 14.8 | 12.7 | 157.3 | 491 | 321 | 364 | 5.23 | 3 + 1 layer |
| 122 | 30 | 70 | 3.5 | 30 | 18 | 15.6 | 163.3 | 499 | 327 | 354 | 4.59 | 3 + 1 layer |
| 127 | 30 | 70 | 3.5 | 30 | 9.7 | 7.1 | 148.5 | 494 | 301 | 195 | 6.02 | 3 + 1 layer |
| 128 | 30 | 70 | 3.5 | 30 | 8.7 | 6.1 | 147.7 | 490 | 302 | 200 | 5.96 | 3 + 1 layer |
| 129 | 30 | 70 | 3.5 | 30 | 6.2 | 4.6 | 143.8 | 491 | 293 | 140 | 5.96 | 3 + 1 layer |
| 130 | 30 | 80 | 0 | 30 | 20 | 15.1 | 182.8 | 505 | 362 | 483 | 3.94 | 2 + 1 layer |
| 131 | 30 | 80 | 0 | 30 | 17.1 | 15.5 | 183.9 | 537 | 342 | 323 | 4.46 | 2 + 1 layer |
| 132 | 30 | 80 | 0 | 30 | 15 | 13.8 | 172.0 | 515 | 334 | 353 | 4.95 | 2 + 1 layer |
| 133 | 30 | 80 | 0 | 30 | 11.2 | 9.4 | 184.6 | 598 | 309 | 110 | 4.96 | 2 + 1 layer |
| 134 | 30 | 80 | 0 | 30 | 8.3 | 7.6 | 172.5 | 578 | 298 | 0 | 5.25 | 2 + 1 layer |
| 135 | 30 | 80 | 0 | 30 | 7 | 7 | 170.3 | 568 | 300 | 0 | 4.47 | 2 + 1 layer |

Fibre composition
Layer 1 30 g/m2 50/50% St32/St61 beating degree 32 SR
Layer 2 70 g/m2 HT-CTMP 750 CSF
Layer 2b 3-5 g/m2 St32 beating degree 20 SR
Layer 3 30 g/m2 50/50% St32/St61 beating degree 34 SR TABLE 1b 1$^{st}$ Series of experiments

| | Nominal basis weights | | | | Weighed-out basis weights | | Total | | | | |
|---|---|---|---|---|---|---|---|---|---|---|---|
| Sample | BW 1 g/m2 | BW 2 g/m2 | BW 2b g/m2 | BW 3 g/m2 | BW 1 + 2 + 2b g/m2 | BW 3 g/m2 | BW (a) g/m2 | Total BW (b) g/m2 | Binder conc. % | Binder in sheet % | Sample designation |
| 120 | 30 | 70 | 3.5 | 30 | 106.9 | 31.1 | 154.9 | 153.8 | 11 | 10.9 | 3 + 1 layer |
| 121 | 30 | 70 | 3.5 | 30 | 106.9 | 31.1 | 158.1 | 157.3 | 14.8 | 12.7 | 3 + 1 layer |
| 122 | 30 | 70 | 3.5 | 30 | 106.9 | 31.1 | 163.5 | 163.3 | 18 | 15.6 | 3 + 1 layer |
| 127 | 30 | 70 | 3.5 | 30 | 106.9 | 31.1 | 148.5 | 148.5 | 9.7 | 7.1 | 3 + 1 layer |
| 128 | 30 | 70 | 3.5 | 30 | 106.9 | 31.1 | 146.9 | 147.7 | 8.7 | 6.1 | 3 + 1 layer |
| 129 | 30 | 70 | 3.5 | 30 | 106.9 | 31.1 | 144.6 | 143.8 | 6.2 | 4.6 | 3 + 1 layer |
| 130 | 30 | 80 | 0 | 30 | 124.0 | 31.1 | 182.7 | 182.8 | 20 | 15.1 | 2 + 1 layer |
| 131 | 30 | 80 | 0 | 30 | 124.0 | 31.1 | 183.7 | 183.9 | 17.1 | 15.5 | 2 + 1 layer |
| 132 | 30 | 80 | 0 | 30 | 127.5 | 31.1 | 184.0 | 184.6 | 15 | 13.8 | 2 + 1 layer |
| 133 | 30 | 80 | 0 | 30 | 124.0 | 31.1 | 171.2 | 172.0 | 11.2 | 9.4 | 2 + 1 layer |
| 134 | 30 | 80 | 0 | 30 | 127.5 | 31.1 | 171.7 | 172.5 | 8.3 | 7.6 | 2 + 1 layer |
| 135 | 30 | 80 | 0 | 30 | 127.5 | 31.1 | 170.6 | 170.3 | 7 | 7 | 2 + 1 layer |
| | | | | | | Average | 165.0 | 165.0 | | | |

Different labs are used in determining basis weights
Basis weight (a) = basis weight used in determining binder content
Basis weight (b) = basis weight determined in conjunction with determination of bending stiffness and other characteristics TABLE 2a 2nd Series of experiments

| | Nominal basis weights | | | | Binder conc. % | Binder in sheet % | BW g/m2 | Thickness um | Density kg/m3 | z-strength kPa | Bending stiffness(MD* CD)Nm7/kg3 | Sample designation | An |
|---|---|---|---|---|---|---|---|---|---|---|---|---|---|
| Sample | BW 1 g/m2 | BW 2 g/m2 | BW 2b g/m2 | BW 3 g/m2 | | | | | | | | | |
| 107 | 40 | 150 | 0 | 40 | 22 | 19.4 | 313 | 0.86 | 363 | 520 | 2.80 | 2 + 1 layer | |
| 108 | 40 | 150 | 0 | 40 | 19 | 12.6 | 289 | 0.87 | 333 | 117 | 2.81 | 2 + 1 layer | |
| 109 | 40 | 150 | 0 | 40 | 16 | 11.7 | 283 | 0.85 | 335 | 0 | 1.90 | 2 + 1 layer | |
| 110 | 40 | 150 | 0 | 40 | 19 | 11.9 | 289 | 0.82 | 351 | 439 | 2.99 | 2 + 1 layer | |
| 111 | 40 | 150 | 0 | 40 | 22 | 13.7 | 295 | 0.86 | 343 | 273 | 2.89 | 2 + 1 layer | |
| 112 | 40 | 150 | 0 | 40 | 25 | 18.4 | 312 | 0.86 | 365 | 452 | 2.89 | 2 + 1 layer | |
| 165b | 40 | 150 | 5 | 40 | 16 | 12.9 | 293 | 0.90 | 327 | 324 | 3.26 | 3 + 1 layer | 1 |
| 166c | 40 | 150 | 5 | 40 | 19 | 18.76 | 310 | 0.88 | 310 | 427 | 2.92 | 3 + 1 layer | 1 |
| 167 | 40 | 150 | 5 | 40 | 13 | 10 | 280 | 0.87 | 322 | 293 | 3.76 | 3 + 1 layer | 1 |
| 168 | 40 | 150 | 5 | 40 | 16 | 12.4 | 287 | 0.89 | 323 | 347 | 3.50 | 3 + 1 layer | 1 |
| 169 | 40 | 150 | 9 | 40 | 19 | 18.3 | 308 | 0.89 | 349 | 258 | 2.97 | 3 + 1 layer | 1 |
| 170 | 40 | 150 | 9 | 40 | 10 | 11.6 | 285 | 0.90 | 308 | 186 | 3.48 | 3 + 1 layer | 1 |
| 171 | 40 | 150 | 9 | 40 | 8 | 7.3 | 284 | 0.94 | 302 | 150 | 3.38 | 3 + 1 layer | 1 |

Fibre composition
Layer 1 30 g/m2 50/50% St32/St61 beating degree 32 SR
Layer 2 70 g/m2 HT-CTMP 750 CSF
Layer 2b 3-5 g/m2 St32 beating degree 20 SR
Layer 3 30 g/m2 50/50% St32/St61 beating degree 34 SR
1) = size press 30-50 mm binder level between rollers TABLE 2b 2nd Series of experiments

| | Nominal basis weights | | | | Weighed-out basis weights | | Total BW) g/m2 | Binder conc. % | Binder in sheet % | Sample designation |
|---|---|---|---|---|---|---|---|---|---|---|
| Sample | BW 1 g/m2 | BW 2 g/m2 | BW 2b g/m2 | BW 3 g/m2 | 1 + 2 + (2 b) g/m2 | BW 3 g/m2 | | | | |
| 107 | 40 | 150 | 0 | 40 | 211 | 41 | 313 | 22 | 19.4 | 2 + 1 layer |
| 108 | 40 | 150 | 0 | 40 | 211 | 41 | 289 | 19 | 12.6 | 2 + 1 layer |
| 109 | 40 | 150 | 0 | 40 | 209 | 42 | 283 | 16 | 11.7 | 2 + 1 layer |
| 110 | 40 | 150 | 0 | 40 | 209 | 45 | 289 | 19 | 11.9 | 2 + 1 layer |
| 111 | 40 | 150 | 0 | 40 | 209 | 45 | 295 | 22 | 13.7 | 2 + 1 layer |
| 112 | 40 | 150 | 0 | 40 | 209 | 45 | 312 | 25 | 18.4 | 2 + 1 layer |
| 165b | 40 | 150 | 5 | 40 | 213 | 42 | 293 | 16 | 12.9 | 3 + 1 layer |
| 166c | 40 | 150 | 5 | 40 | 210 | 42 | 310 | 19 | 18.76 | 3 + 1 layer |
| 167 | 40 | 150 | 5 | 40 | 210 | 42 | 280 | 13 | 10 | 3 + 1 layer |
| 168 | 40 | 150 | 5 | 40 | 210 | 42 | 287 | 16 | 12.4 | 3 + 1 layer |
| 169 | 40 | 150 | 9 | 40 | 210 | 42 | 308 | 19 | 18.3 | 3 + 1 layer |
| 170 | 40 | 150 | 9 | 40 | 210 | 42 | 285 | 10 | 11.6 | 3 + 1 layer |
| 171 | 40 | 150 | 9 | 40 | 221 | 42 | 284 | 8 | 7.3 | 3 + 1 layer |

The invention claimed is:

1. A paper or paperboard laminate comprising:

at least one bulk-promoting layer, here termed bulk layer, 40-98% of which is composed of cellulose fibers with a freeness value of 550-950 ml CSF;

at least one secondary layer on at least one side of the bulk layer, the secondary layer having a greater density than the bulk layer, the secondary layer and bulk layer being joined indirectly to one another over essentially the entire of their opposing surfaces as a laminate, the laminate having a bending stiffness index greater than 2.5 $Nm^7/kg^3$, but less than 14 $Nm^7/kg^3$, calculated as a geometric mean value for machine direction and cross direction; and a thin intermediate fiber layer between the said bulk layer and said secondary layer, said intermediate layer having a higher drainage resistance than the bulk layer, and which has a basis weight of at least 2 g/m² but less than 20 g/m² and which has been formed together with the bulk layer, the fibers of the intermediate layer being partially oriented in the z-direction of the laminate and mixed with and anchored in a fiber surface of the bulk layer.

2. The paper or paperboard laminate according to claim 1, wherein said intermediate layer has a drainage resistance of less than 35° SR.

3. The paper or paperboard laminate according to claim 1, wherein said intermediate layer has a drainage resistance of less than 30° SR.

4. The paper or paperboard laminate according to claim 1, wherein said intermediate layer has a drainage resistance of less than 20° SR.

5. The paper or paperboard laminate according to claim 1, wherein said intermediate layer has a basis weight of at least 3 g/m² but less than 15 g/m².

6. The paper or paperboard laminate according to claim 1, wherein said intermediate layer has a basis weight of at least 3 g/m² but less than 10 g/m².

7. The paper or paperboard laminate according to claim 1 wherein said intermediate layer comprises fibers of bleached or unbleached chemical pulp or CTMP.

8. The paper or paperboard laminate according to claim 1 wherein said intermediate layer comprises fibers of bleached or unbleached chemical cellulose pulp produced from a cellulose raw material comprised of softwood and/or hardwood.

9. The paper or paperboard laminate according to claim 1 wherein the bulk layer also contains at least one binder with a content of 1-20% of the weight of the laminate, calculated as dry weights.

10. The paper or paperboard laminate according to claim 9 wherein the binder is a latex binder.

11. The paper or paperboard laminate according to claim 9 wherein the content is 1-7% of the weight of the laminate, calculated as dry weights.

12. The paper or paperboard laminate according to claim 9, wherein said binder is selected from the group consisting of water-soluble polymers, aqueous dispersions of polymers, starch, carboxymethyl cellulose and gums.

13. The paper or paperboard laminate according to claim 12, wherein said binder is selected from the group consisting of polyvinyl acetate, polyvinyl alcohol, polyacrylates, polyacrylic acid, polyethylene, polyacrylamide, polystyrene and maleic acid derivative in the form of homo- and copolymers of said polymers.

14. The paper or paperboard laminate according to claim 9, wherein said binder is selected from the group consisting of starch, carboxymethyl cellulose and gums and is an adhesive between the intermediate layer and the secondary layer.

15. The paper or paperboard laminate according to claim 9 wherein the content is 1-10% of the weight of the laminate, calculated as dry weights.

16. The paper or paperboard laminate according to claim 1, wherein the laminate has been consolidated by addition of binder to the bulk layer by way of the intermediate layer with a content of 1-20% of the weight of the laminate, calculated on dry weights, followed by pressing and drying.

17. The paper or paperboard laminate according to claim 16, wherein the binder is a latex binder.

18. The paper or paperboard laminate according to claim 16, wherein the content is of 1-10% of the weight of the laminate, calculated on dry weights.

19. The paper or paperboard laminate according to claim 16, wherein the content is 1-5% of the weight of the laminate, calculated on dry weights.

20. The paper or paperboard laminate according to claim 16, wherein said binder is selected from the group consisting of water-soluble polymers, aqueous dispersions of polymers, starch, carboxymethyl cellulose and gums.

21. The paper or paperboard laminate according to claim 20, wherein said binder is selected from the group consisting of polyvinyl acetate, polyvinyl alcohol, polyacrylates, polyacrylic acid, polyethylene, polyacrylamide, polystyrene and maleic acid derivative in the form of homo- and copolymers of said polymers.

22. The paper or paperboard laminate according to claim 1, wherein said laminate has a z-strength of at least 100 kPa.

23. The paper or paperboard laminate according to claim 22, wherein said laminate has a z-strength of at least 200 kPa.

24. The paper or paperboard laminate according to claim 1 wherein the laminate has intermediate layers and secondary layers on both sides of the bulk layer.

25. The paper or paperboard laminate according to claim 1, wherein the laminate has a second bulk layer, 40-98% of which is comprised of cellulose fibers with a freeness value of 550-950 ml CSF, and which has been formed together with a second intermediate layer, the two intermediate layers being turned towards one another and joined directly to one another over essentially the entire of their opposing surfaces.

26. The paper or paperboard laminate according to claim 1, wherein the laminate has an intermediate layer and a first secondary layer on one side of the bulk layer, and a second secondary layer on the other side of the bulk layer, which second secondary layer has been formed together with the bulk layer and the intermediate layer.

27. The paper or paperboard laminate according to claim 1, wherein at least 60% of the bulk layer is composed of fibers with a freeness value greater than 600 ml CSF but less than 850 ml CSF, and the laminate has a bending stiffness index higher than 3.0 Nm⁷/kg³, calculated as a geometric mean value for machine and cross direction.

28. The paper or paperboard laminate according to claim 27, wherein the freeness value is at least 700 but less than 850 ml CSF, and that the laminate has a bending stiffness index higher than 5.0 Nm⁷/kg³, calculated as a geometric mean value for machine and cross direction.

29. The paper or paperboard laminate according to claim 1, wherein the bulk layer has a density of 50-300 kg/m³, a basis weight of 30-300 g/m², and a thickness of 0.1-6 mm.

30. The paper or paperboard laminate according to claim 29, wherein the bulk layer has a density of 100-180 kg/m³, a basis weight of 70-120 g/m² and a thickness of 0.3-0.7 mm.

31. The paper or paperboard laminate according to claim 1, wherein the cellulose fibers in the bulk layer comprise cellulose fibers made by a mechanical, thermomechanical or chemi-thermomechanical pulp manufacturing method.

32. The paper or paperboard laminate according to claim 31, wherein the cellulose fibers in the bulk layer comprise cellulose fibers made by a mechanical, thermomechanical or chemi-thermomechanical pulp manufacturing method with a wood yield of >75% from cellulose fibers of TMP and/or CTMP pulp with said freeness values.

33. The paper or paperboard laminate according to claim 1, wherein said secondary layer has a higher drainage resistance than said intermediate layer and a basis weight of 30-150 g/m² and a density of 300-1500 g/m³.

34. The paper or paperboard laminate according to claim 33, wherein said secondary layer has a drainage resistance greater than 20° SR but less than 65° SR and a density of 400-850 g/m³.

35. The paper or paperboard laminate according to claim 1, wherein at least one secondary layer comprises bleached or unbleached chemical sulphate, sulphite or organosolv cellulose pulp.

36. The paper or paperboard laminate according to claim 35, wherein the least one secondary layer comprises bleached or unbleached chemical sulphate, sulphite or organosolv cellulose pulp made from a cellulose raw material comprised of softwood and/or hardwood.

37. The paper or paperboard laminate according to claim 1, wherein said secondary layer is comprised of a barrier layer comprising plastic film, aluminum foil or a metallized plastic film.

* * * * *